United States Patent [19]
Aoki

[11] Patent Number: 4,958,242
[45] Date of Patent: Sep. 18, 1990

[54] CUE SIGNAL RECORDING CONTROL SYSTEM FOR VIDEO TAPE RECORDER

[75] Inventor: Morio Aoki, Katsuta, Japan

[73] Assignee: Hitachi, Ltd., Tokyo, Japan

[21] Appl. No.: 364,460

[22] Filed: Jun. 12, 1989

[30] Foreign Application Priority Data

Jun. 15, 1988 [JP] Japan ................... 63-145706

[51] Int. Cl.$^5$ .......................... G11B 5/02; G11B 27/02
[52] U.S. Cl. ........................................ 360/27; 360/14.2
[58] Field of Search .................... 360/14.2, 14.3, 27, 360/72.2, 14.1, 74.4; 358/311; 369/47, 83

[56] References Cited

U.S. PATENT DOCUMENTS

| | | | |
|---|---|---|---|
| 4,691,250 | 9/1987 | Ookawa | 360/72.2 |
| 4,691,251 | 9/1985 | Ookawa | 360/14.2 |
| 4,707,749 | 11/1987 | Nishijima et al. | 360/14.3 |

FOREIGN PATENT DOCUMENTS 9171062  9/1984  Japan .

Primary Examiner—Vincent P. Canney
Attorney, Agent, or Firm—Antonelli, Terry, Stout & Kraus

[57] ABSTRACT

In a video tape recorder in which a video signal is recorded on a video track, a control signal is recorded on a control track and when reproducing, the control signal is used as tracking signal to control the running speed of the magnetic tape, time is supervised to recognize whether a predetermined period of time expires during the recording pause mode, a cue signal for tape heading is generated at the expiration of the predetermined time or up on change of date, and the thus generated cue signal is recorded on the control track in correspondance to a portion from which recording of individual pieces of information in the video signal starts, thereby making it easy to control edition and heading of the tape.

7 Claims, 2 Drawing Sheets

F I G. 1
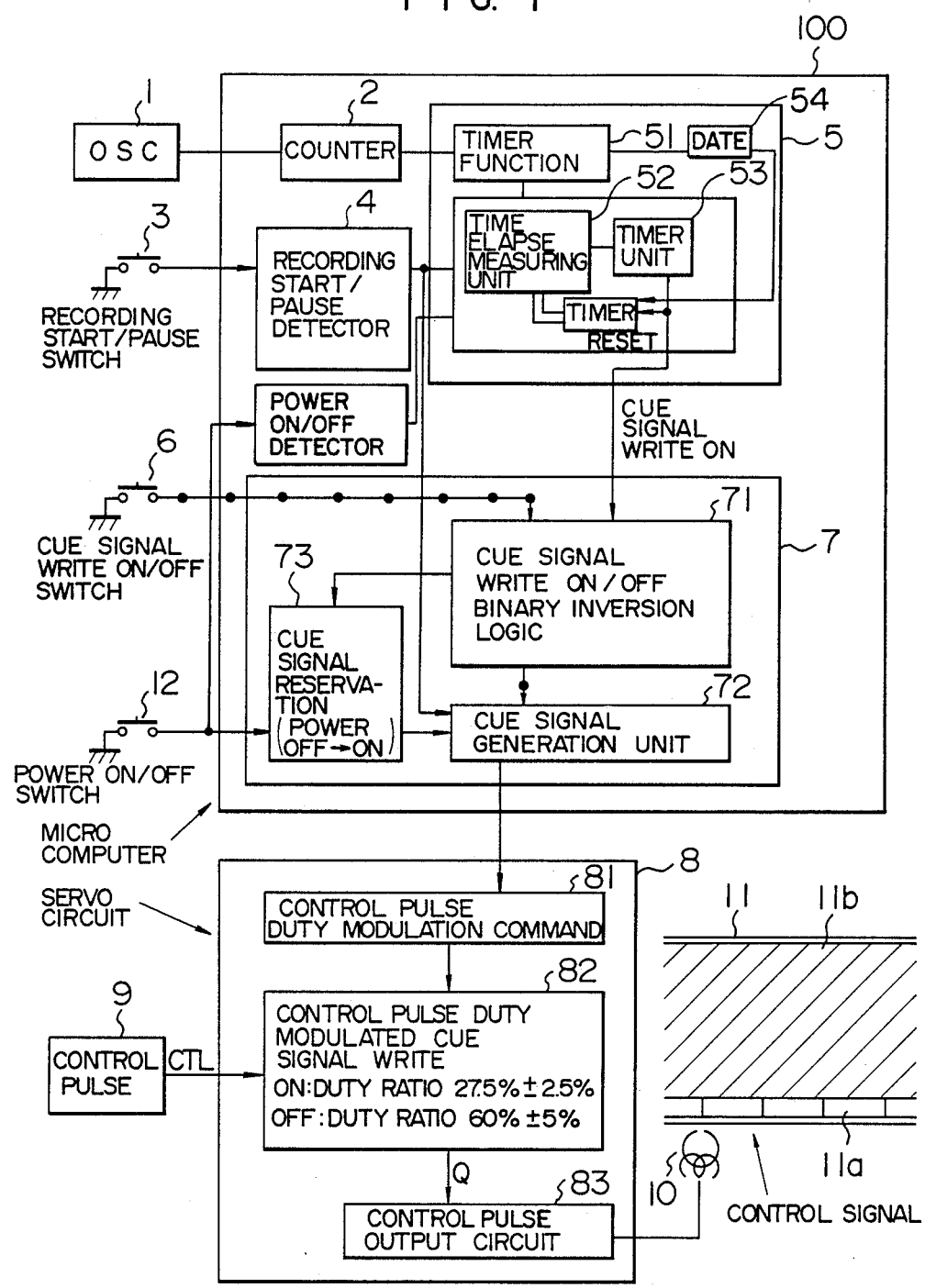

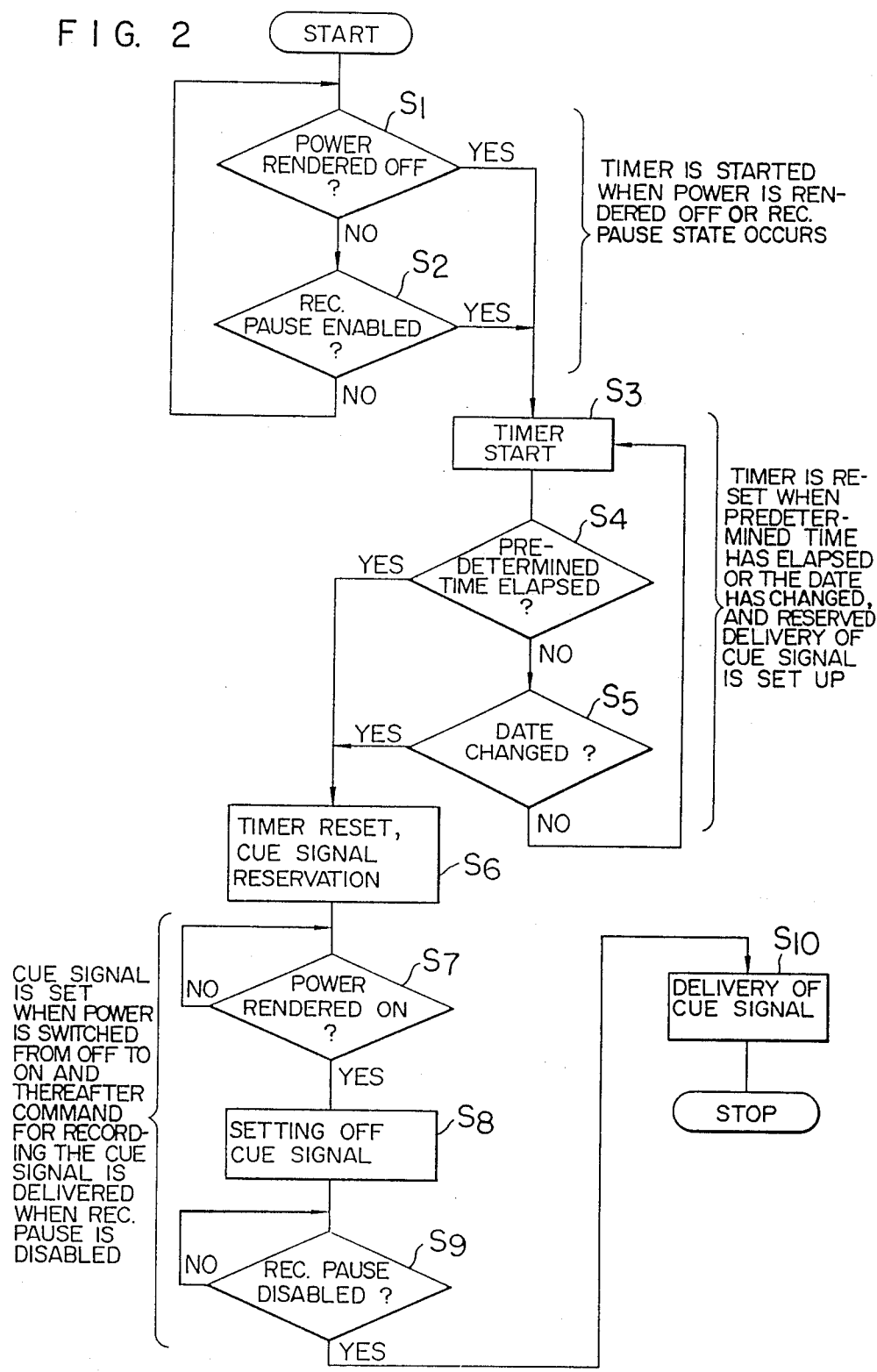

CUE SIGNAL RECORDING CONTROL SYSTEM FOR VIDEO TAPE RECORDER

BACKGROUND OF THE INVENTION

This invention relates to a system for automatically recording a so-called cue signal (Q) used, upon reproduction, to rapidly detect the position of a recording signal (information) on a magnetic tape in a magnetic recording/reproducing apparatus such as for example a video tape recorder integral with a video camera.

As disclosed in, for example, JP-A-59-171062 and U.S. Pat. No. 4,707,749, in prior art apparatus, cue signals for tape heading are recorded in correspondence to portions, on a control track of a magnetic tape, from which recording of individual pieces of a plurality of video information having different contents starts.

For example, when many scenes are recorded within a relatively short period of time by using a video movie having the above tape heading function, there result the following disadvantages. As an example, an instance is considered wherein a vacation or sightseeing trip is made to a plurality of areas A, B, C and D through a route A→B→C→D→A, noted sightseeing places in each area are recorded by the movie to record scenes on the magnetic tape, and thereafter the recorded contents are reproduced. In such a case, a cue signal (Q) is recorded on a portion from which recording of each imaged scene starts. Therefore, when an imaged scene in the area C is desired to be viewed, detection of cue signals (Q) of respective imaged scenes in the areas A and B which are imaged earlier than the imaged scene in the area C is repeated and thereafter detection of a cue signal (Q) for the imaged scene in the intended area C is carried out, raising problems that retrieval of the imaged scene in the area C is very sophisticated and is time-consuming.

SUMMARY OF THE INVENTION

The present invention contemplates elimination of the prior art drawbacks and has for its object to provide a cue signal (Q) recording system which can permit skillful retrieval of recorded information when reproducing.

According to the invention, a cue signal (Q) recording system features means for supervising time such as a period of time from the occurrence of pause of imaging (recording) of a scene to either the occurrence of start of imaging (recording) of the next scene or the time of change of date time for automatically recording a cue signal (Q) on a recording medium on the basis of the supervised time.

In this invention, the cue signal (Q) recorded in accordance with the supervised time can make easy the retrieval effected when reproducing individual scenes imaged (recorded) by the movie or the like and insure the provision of easy-to-handle products.

BRIEF DESCRIPTION OF THE DRAWINGS

FIG. 1 is a block diagram illustrating an embodiment of a cue signal (Q) recording system according to the invention; and FIG. 2 is a flow chart useful to explain the operation of the system shown in FIG. 1.

DESCRIPTION OF THE PREFERRED EMBODIMENT

The invention will now be described by way of example with reference to the accompanying drawings.

FIG. 1 is a block diagram illustrating a cue signal (Q) recording system of a magnetic recording/reproducing apparatus according to the invention and FIG. 2 is a flow chart for explaining the operation. Referring to FIG. 1 and FIG. 2, reference numeral 12 designates a power on/off switch, reference numeral 1 designates an oscillation circuit for generating a clock signal, 2 a counter connected to the oscillation circuit 1 to count the number of clocks in the clock signal generated from the oscillation circuit, 3 a recording start/pause switch for which, for example, an imaging switch adapted to record video signals on the magnetic tape may be utilized, 4 a recording start/pause detector for detecting the state of the switch 3, 4' a power on/off detector for detecting the state of the on/off switch 12 (see $S_1$ in FIG. 2), and 5 a time supervising means for measuring a predetermined period of time T starting ($S_3$) when the power is switched off ($S_1$) the time that the recording mode is switched to the recording pause mode ($S_2$), the predetermined period of time T being, for example, 4 hours and for generating a command signal for enabling write of a cue signal (Q) (a cue signal (Q) write ON command signal) when during the off period or the recording pause mode, the time T has elapsed ($S_4$) or the date changed ($S_5$). The time supervising means comprises a timer function unit 51 which receives the output of the counter and performs the timer function, a time lapse measuring unit 52 which receives the output of the recording start/pause detector 4 and when recording pauses, measures the predetermined period of time T on the basis of information from the timer function unit 51, and a timer unit 53 which at the expiration of the predetermined time delivers a cue signal ($S_6$) (Q) write ON command signal. A date change unit 54 on the basis of information from unit 51 also delivers a cue signal (Q) write ON command signal upon change of date ($S_6$). Denoted by 6 is a cue signal (Q) write ON/OFF manual switch, and 7 a cue signal (Q) generation means which, when the switch 6 is turned off, receives the cue signal (Q) write ON command signal and delivers a cue signal (Q). The cue signal (Q) generation means comprises a binary inversion logic unit 71 for cue signal (Q) write ON/OFF (cue signal (Q) write ON/OFF binary inversion logic unit 71) which responds to an ON/OFF signal of the cue signal (Q) write on/OFF switch 6 to invert the output of the timer unit 53, for example, to turn off the output of the timer unit 53 when the switch 6 is turned on ($S_8$) (pushed) with the cue signal (Q) write rendered on, and a cue signal (Q) generation unit 72 which receives the output of the logic unit and delivers the cue signal (Q) ($S_{10}$) for modulating the duty ratio of a control pulse as will be described later. Where the delivery of the cue signal (Q) is so designed as to be effected at the expiration of a period of time, the delivery is enabled when the external power ON/OFF switch 12 is switched from off to on($S_8$). Therefore, in this case, the command signal is reserved in a cue signal (Q) reservation unit 73. The switch 6 is operable to deliver a cue signal (Q) write signal so as to directly effect cue signal (Q) write ON/OFF setting. Excepting the switches 3 and 6 and oscillation circuit 1, all of the components are included in a microcomputer having the function as exemplified in FIG. 2. The timer function unit 51 may be separated from the microcomputer 5. Reference numeral 9 designates a control pulse generation circuit, 8 a controller including circuits 81, 82 for modulating a control pulse CTL with the output of the cue signal (Q) generation unit 72 to produce a modulated signal of a well known form, 10 a control head, and 11 a magnetic tape. Generally, the controller 8 is well known from, for example, the prior art reference described previously and details thereof will not be described herein.

With the above construction, when the recording start/pause switch 3 is now switched from on to off to terminate (with power rendered off) imaging (recording) of a scene or to set up the recording pause state, the time lapse measuring unit 52 of the time supervising means 5 starts to measure time t following the occurrence of termination (power rendered off) or recording pause state on the basis of an output signal from the timer function unit 51. When the measured time t exceeds, for example, the predetermined time T, that is t ≧ T stands, the measuring unit 52 sends information to that effect to the timer unit 53 which in turn delivers a cue signal (Q) write ON command signal. The command signal is reserved in the signal reservation unit 73($S_6$). In response to switching of the external power ON/OFF switch 12 from off to on($S_7$), the cue signal (Q) reservation unit supplies the command signal to the cue signal (Q) generation means($S_8$). Under the application of the signal supplied from the reservation unit, the cue signal (Q) generation means 7 operates, with the recording pause state released($S_9$), to supply the output of the generation means 7 to the modulation circuit 82 of the controller 8. Upon receipt of the output from the cue signal (Q) generation means 7, the modulation circuit 82 modulates the duty ratio of the control signal CTL of the control pulse generation circuit 9 to produce a tape cue signal (Q) which is delivered to a control pulse output circuit 83($s_{10}$). When the recording mode occurs again, the signal Q is recorded on a control track 11a of the magnetic tape 11 having video track 11b through a control head 10. As described above, it is not until the predetermined time T expires that the cue signal (Q) is permitted to be recorded, thereby ensuring that recording of the cue signal (Q) at the time of imaging each scene can be prevented to speed up heading of the tape after recording when recording repeatedly affected at short intervals. If recording of the cue signal (Q) is desired to be effected as usual each time that each scene is imaged, this can be done by operating the cue signal (Q) write ON/OFF switch 6. More specifically, by turning on (pushing) the switch 6 when the cue signal (Q) write command signal from the time supervising means 5 is switched off, the logic unit 71 of the cue signal (Q) generation means 7 is caused to invert from off to on and as a result, the cue signal (Q) generation unit 72 is started to operate and thereafter execution of the above-described heading recording operation follows.

What is claimed is:

1. A cue signal recording system for a video tape recording apparatus comprising means for generating a cue signal; means for recording the cue signal generating means on a control track of a video tape when recording is enabled; and control means for activating said cue signal generating means only upon occurrence of a predetermined event, said control means including a timer function unit, a detector unit for detecting the recording mode and a mode other than said recording mode, a date change unit responsive to the detector unit for delivering a cue signal write ON command signal when a change of data occurs, and a cue signal generation unit responsive to the output of said data change unit to deliver a cue signal.

2. A cue signal recording system for a video tape recording apparatus comprising means for generating a cue signal; means for recording the cue signal generating means on a control track of a video tape when recording is enabled; and control means for activating said cue signal generating means only upon occurrence of a predetermined event, said control means including a timer function unit, a detector unit for detecting the recording mode and a mode other than said recording mode; a time lapse measuring unit for measuring time (t) during the mode other than said recording mode when the former mode is detected, a timer unit for delivering a cue signal write ON command signal when the time (t) measured by said measuring unit amounts to a predetermined period of time (T), and a cue signal generation unit responsive to the output of said timer unit to deliver a cue signal.

3. A cue signal recording system according to claim 2 further comprising means for inhibiting said control means.

4. A cue signal recording system according to claim 2, wherein said control means further comprises a date change unit responsive to said detector unit for delivering a cue signal write ON command signal when a change of date occurs, said time lapse measuring unit being reset in response to the delivery of the cue signal write ON command signal.

5. A cue signal recording system for a video tape recording apparatus comprising means for generating a cue signal; means for recording the cue signal generating means on a control track of a video tape when recording is enabled; and control means for activating said cue signal generating means only upon occurrence of a predetermined event, said control means including detecting means for detecting at least one of a non-recording mode during recording enablement and a power off state of the video tape recording apparatus and providing an output indicative thereof, timing means responsive to the output of the detecting means for measuring a predetermined time period and for activating said cue signal generating means upon expiration of the predetermined time, and a change date means responsive to a change in date for activating said cue signal generating means in accordance therewith.

6. A cue signal recording system according to claim 5, wherein said timing means is responsive to said change date means for resetting the timing thereof when said change data means activates said cue signal generating means prior to expiration of the predetermined time period.

7. A cue signal recording system according to claim 6, wherein said video tape recording apparatus is a video camera.

* * * * *